(12) United States Patent
Moyer

(10) Patent No.: US 7,539,906 B2
(45) Date of Patent: May 26, 2009

(54) SYSTEM FOR INTEGRATED DATA INTEGRITY VERIFICATION AND METHOD THEREOF

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 590 days.

(21) Appl. No.: 11/094,593

(22) Filed: Mar. 30, 2005

(65) Prior Publication Data

US 2006/0230315 A1 Oct. 12, 2006

(51) Int. Cl.
*G06F 11/00* (2006.01)

(52) U.S. Cl. .......................... 714/42; 714/732

(58) Field of Classification Search ............... 714/4, 714/732, 718, 728, 736, 42
See application file for complete search history.

(56) References Cited

U.S. PATENT DOCUMENTS

| | | | |
|---|---|---|---|
| 5,517,615 A | 5/1996 | Sefidvash et al. | |
| 5,742,616 A * | 4/1998 | Torreiter et al. | 714/732 |
| 5,978,946 A * | 11/1999 | Needham | 714/732 |
| 6,311,311 B1 * | 10/2001 | Swaney et al. | 716/4 |
| 6,357,024 B1 | 3/2002 | Dutton | |
| 6,966,017 B2 * | 11/2005 | Evans | 714/718 |
| 6,990,621 B2 * | 1/2006 | Maneparambil et al. | 714/742 |
| 7,203,878 B2 * | 4/2007 | Naegle et al. | 714/732 |
| 7,266,746 B2 * | 9/2007 | Hiraide | 714/738 |
| 2003/0074619 A1 * | 4/2003 | Dorsey | 714/733 |
| 2004/0003332 A1 * | 1/2004 | Kim et al. | 714/744 |
| 2005/0060626 A1 | 3/2005 | Rajski et al. | |
| 2006/0020860 A1 * | 1/2006 | Tardif et al. | 714/724 |

* cited by examiner

*Primary Examiner*—Robert Beausoliel
*Assistant Examiner*—Philip Guyton

(57) ABSTRACT

In accordance with one technique, a first plurality of values associated with data transfers between a processor and a memory is received at the processor and at least a subset of the first plurality of values are accumulated in one or more accumulators. The one or more accumulators are accessed to obtain a first accumulated value and the first accumulated value is compared with a first expected accumulated value. In accordance with a second technique, a first plurality of load operations are performed at a processor to access data values stored in a first sequence of fields of a memory. The data values are accumulated in one or more accumulators of the processor to generate a first accumulated value and it is determined whether the memory has been corrupted based on a comparison of the first accumulated value to a first expected accumulation value.

32 Claims, 5 Drawing Sheets

DCR – 272; READ/WRITE; RESET – 0x0
PARALLEL SIGNATURE CONTROL REGISTER (PSCR)

DCR – 273; READ/WRITE; RESET – UNAFFECTED
PARALLEL SIGNATURE STATUS REGISTER (PSSR)

DCR – 274; READ/WRITE; RESET – UNAFFECTED
PARALLEL SIGNATURE HIGH REGISTER (PSHR)

DCR – 274; READ/WRITE; RESET – UNAFFECTED
PARALLEL SIGNATURE LOW REGISTER (PSLR)

| HIGH SIGNATURE UPDATE DATA |
|---|

0  1  2  3  4  5  6  7  8  9  10  11  12  13  14  15  16  17  18  19  20  21  22  23  24  25  26  27  28  29  30  31

DCR – 277; WRITE-ONLY; RESET – UNAFFECTED

PARALLEL SIGNATURE UPDATE HIGH REGISTER (PSUHR)

*FIG. 8*

| LOW SIGNATURE UPDATE DATA |
|---|

0  1  2  3  4  5  6  7  8  9  10  11  12  13  14  15  16  17  18  19  20  21  22  23  24  25  26  27  28  29  30  31

DCR – 278; WRITE-ONLY; RESET – UNAFFECTED

PARALLEL SIGNATURE UPDATE LOW REGISTER (PSULR)

*FIG. 9*

| COUNTER |
|---|

0  1  2  3  4  5  6  7  8  9  10  11  12  13  14  15  16  17  18  19  20  21  22  23  24  25  26  27  28  29  30  31

DCR – 276; READ/WRITE; RESET – UNAFFECTED

PARALLEL SIGNATURE COUNTER REGISTER (PSCTR)

SYSTEM FOR INTEGRATED DATA INTEGRITY VERIFICATION AND METHOD THEREOF

FIELD OF THE DISCLOSURE

The present disclosure relates generally to data integrity verification and more particularly to hardware-based data integrity verification.

BACKGROUND

Data integrity is a common concern in real-time and critical systems. The corruption of data or the misoperation of one or more components of the system has potential to lead to catastrophic failure of such a system. Accordingly, techniques have been developed to verify the integrity of stored data as well as the components which store and process such data. However, these conventional techniques tend to be either software-intensive or tend to require considerable additional hardware, thereby increasing the cost and complexity of implementing these conventional data integrity verification techniques, as well as introducing a considerable delay or overhead, therefore overburdening such real-time or critical systems. Accordingly, an integrated data integrity verification technique would be advantageous.

BRIEF DESCRIPTION OF THE DRAWINGS

The purpose and advantages of the present disclosure will be apparent to those of ordinary skill in the art from the following detailed description in conjunction with the appended drawings in which like reference characters are used to indicate like elements, and in which:

FIGS. 4-10 are block diagrams illustrating exemplary registers utilized by the parallel signature unit of FIG. 3 in accordance with at least one embodiment of the present disclosure.

DETAILED DESCRIPTION OF THE DISCLOSURE

The following description is intended to convey a thorough understanding of the present disclosure by providing a number of specific embodiments and details involving multilayer slot antennas and integrated circuit packages having such antennas embedded. It is understood, however, that the present disclosure is not limited to these specific embodiments and details, which are exemplary only. It is further understood that one possessing ordinary skill in the art, in light of known systems and methods, would appreciate the use of the disclosure for its intended purposes and benefits in any number of alternative embodiments, depending upon specific design and other needs.

FIGS. 1-12 illustrate exemplary techniques for integrated data integrity verification in processing systems. In at least one embodiment, an accumulator, such as, for example, a multiple input signature register (MISR), is utilized by a processor to accumulate values received from, or provided to, a memory over a bus coupling the processor to the memory. The resulting accumulated value can be compared with an expected accumulation value to verify that the contents of the memory and/or the operation of one or more components of the system are valid. Moreover, in one embodiment the accumulator may be utilized in two modes: one mode as a data integrity verification component; and another mode as a pseudo random number generator.

Figure 1:
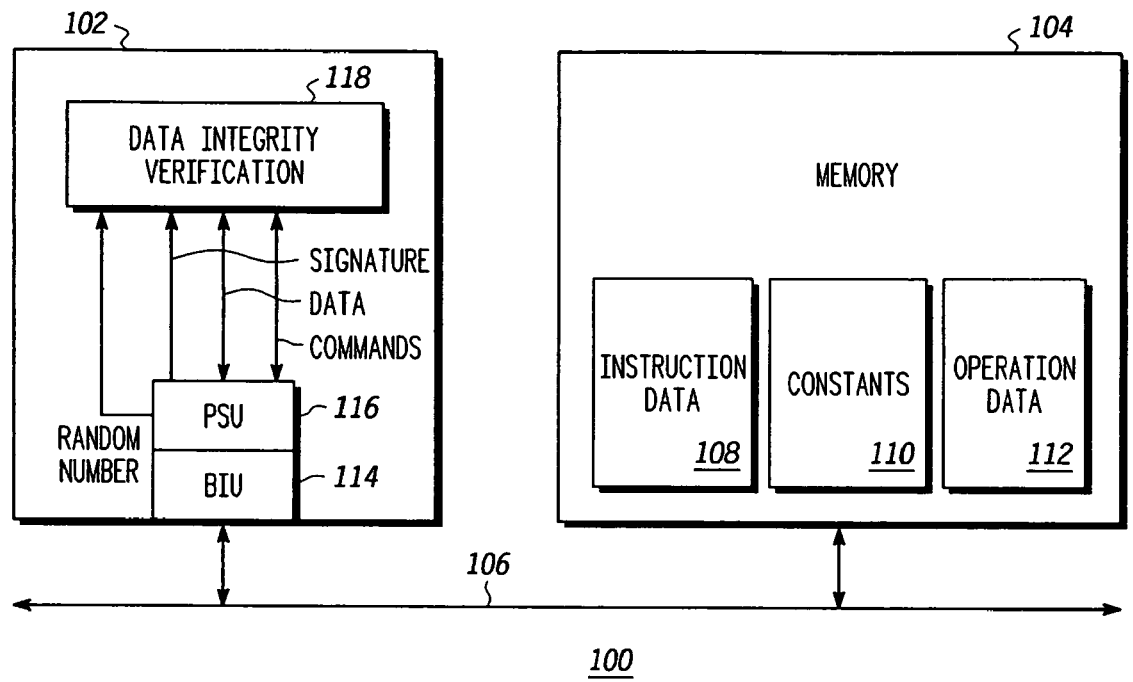
FIG. 1 is a block diagram illustrating an exemplary processing system implementing a data integrity verification technique in accordance with at least one embodiment of the present disclosure.

Referring now to FIG. 1 an exemplary processing system utilizing an integrated data verification technique is illustrated in accordance with at least one embodiment of the present disclosure. In the illustrated example, the system 100 includes a processor 102, a memory 104 and one or more buses 106 connecting the processor 102 to the memory 104. The processor 102 may include any of a variety of processing devices, such as a microprocessor or a microcontroller having a central processing unit (CPU), a digital signal processor, a dedicated algorithm processor, or any other type of data processing device. The memory 104 may comprise any of a variety of memory structures utilized to store data for use by the processor 102. For example, the memory 104 may be used to store instruction data 108 which may include data representative of one or more instructions executed by the processor 102, constant values 110 which may represent constants used by one or more programs executed by the processor 102, and operation data 112 which represents data utilized by one or more programs executed by the processor 102. For ease of discussion, reference to the term data is applicable to all types of data including instruction data, constants and operation data, unless otherwise noted herein.

The processor 102, as illustrated, includes a bus interface unit (BIU) 114 which connects the processor 102 to the one or more buses 106, and a parallel signature unit (PSU) 116, which, as described in greater detail with reference to FIGS. 2-12, may be utilized by a data integrity verification routine 118 to accumulate values transmitted via the one or more buses 106 as provided via the bus interface unit 114. The accumulated value generated by the PSU 116 may be utilized by the data integrity verification routine 118 to verify the integrity of data stored in memory 104, as well as to verify the correct operation of one or more components of the processor 102, memory 104 and bus 106. The data integrity verification routine 118 may be implemented as a stand-alone program executed by the processor 102 for data integrity verification purposes, or the routine 118 may be implemented as a subroutine or function of another program.

To illustrate, an exemplary operation of the PSU 116 and the data integrity verification routine 118, assume that the system 100 is utilized, for example, in a real-time or critical system such as part of an automotive component or avionic component. In such instances, the corruption of instruction data, operation data or constants used by one or more programs executed by the processor 102 is likely to lead to a misoperation and possible failure of the system 100. Such a failure typically has substantial safety and cost implications. Accordingly, the data integrity verification routine 118 may verify the integrity of the data stored in memory 104 (and thus the integrity of the program stored in memory 104) by directing the processor 102 to access the data from memory 104 in a known sequence. As the data is provided from the memory to the processor 102 via bus 106, the BIU 114 receives the data and provides it to the PSU 116 whereupon the data is accumulated into a data signature value representative of the accumulated data values and the ordering of the accumulation of those values. After accessing some or all of the data in the prescribed sequence, the data integrity verification routine 118 may obtain the accumulated value from the PSU 116 and compare the accumulated value with an expected accumulated value, wherein the expected accumulated value is predetermined based from, for example, a simulation using the same data values in the same sequence of accumulation. In the event that the actual accumulated value and the expected accumulated value are the same, the data integrity verification routine 118 may assume that the data stored in memory 104 is valid and that the components are operating as expected. However, should the actual and expected accumulated values not match, the data integrity verification routine 118 may signal a faulty operation of the memory 104 or other portion of system 100, whereupon the processor 102 or other programs or portions of system 100 utilizing the data integrity verification routine 118, may suspend operations or take corrective actions in an attempt to overcome the loss of data integrity in the system 100.

In another mode of operation, the PSU 116 may be utilized as a pseudo random number generator by feeding it a seed value and allowing it to accumulate using values received from the BIU 114 in response to data transfer operations over the bus 106. The resulting accumulated value may be utilized as a pseudo random number by one or more programs executed by the processor 102. Alternatively, the data values to be accumulated may be supplied by software executing on processor 102 directly to the PSU 116.

Figure 2:
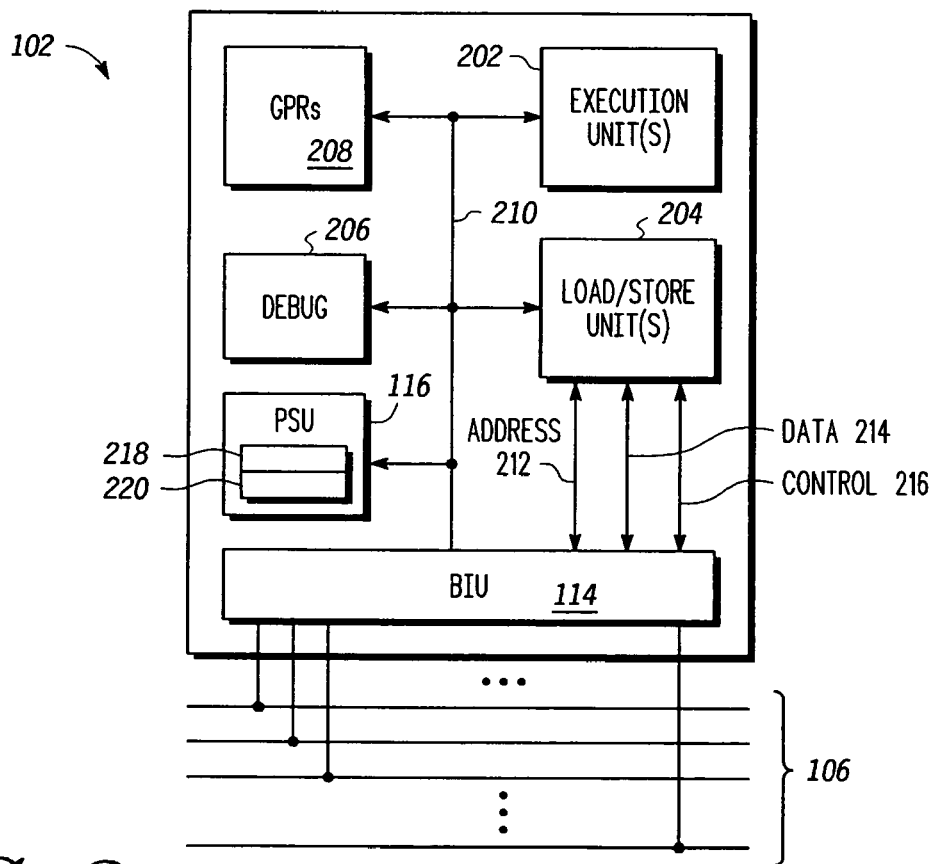
FIG. 2 is a block diagram illustrating an exemplary implementation of a processor of the system of FIG. 1 in accordance with at least one embodiment of the present disclosure.

Referring now to FIG. 2, a more detailed implementation of the processor 102 is illustrated in accordance with at least one embodiment of the present disclosure. As illustrated, the processor 102 includes one or more execution units 202, one or more load/store units 204, a debug module 206, the PSU 116 and the BIU 114. The components of the processor 102 may be connected via one or more internal buses 210. As also illustrated, the load/store units 204 may be coupled to the BIU 114 via one or more buses such as an address bus 212, a data bus 214 and a control bus 216. The processor 102 further may comprise one or more sets of general purpose registers 208 and the PSU 116 may implement or maintain one or more device registers, such as special purpose registers 218 and 220.

In operation, the one or more execution units 202 execute instructions involving the transfer of data to and from memory 104 (FIG. 1) via one or more buses 106. In implementing these instructions, the load/store unit 204 provides address data to the BIU 114 via the address bus 212 and control data to the BIU 114 via control bus 216. Moreover, the load/store unit 204 provides data to the BIU 114 via data bus 214, as well as receives data from the BIU via the data bus 214. The data received from memory 104 may include instruction data representing instructions to be executed by the execution units 202 or it may represent operation data or constants utilized by the execution unit 202 during its execution of one or more instructions. In at least one embodiment, the BIU 114 provides values input from and/or output to the bus 106 to the PSU 116. The PSU 116 in turn, accumulates selected values and the resulting accumulated value may be obtained by accessing a special purpose register (e.g. special purpose register 218, maintained by the PSU 116). Software executing on processor 102 may determine the specific locations in memory containing data values to be accumulated and the order of accumulation of those values by executing a sequence of load and store instructions, with each load or store instruction addressing a particular location containing a data value which is desired to be accumulated, and performing the load or store operations in a predetermined or run-time dynamic sequence. The ordering and location of the values to be accumulated may thus be flexibly determined and arbitrarily changed to suit the particular needs of the user of system 100 by selecting a particular embodiment of accumulation software to execute. By allowing software to determine the actual operation of data accumulation, the specific integrity checking needs of the user of system 100 may be flexibly realized, with low overhead, and with reduced costs. To initialize or seed the PSU 116, the execution unit 202 may write a seed or initialization value to a special purpose register of the PSU 116, such as the special purpose register 220. Thus, by implementing the PSU 116 as hardware accessible by both the execution unit 202 by means of software control, and by the BIU 114, in response to selected bus transfers, the overhead associated with obtaining an accumulated value for purposes of data integrity verification or as a pseudo random number may be reduced, as the accumulated value may be accessed directly from a register rather than requiring a load operation from a device external to the processor. Moreover, the PSU 116 may be clocked so as to operate in parallel with other components of the processor 102 thereby reducing or eliminating any delay associated with its accumulation operations.

Figure 3:
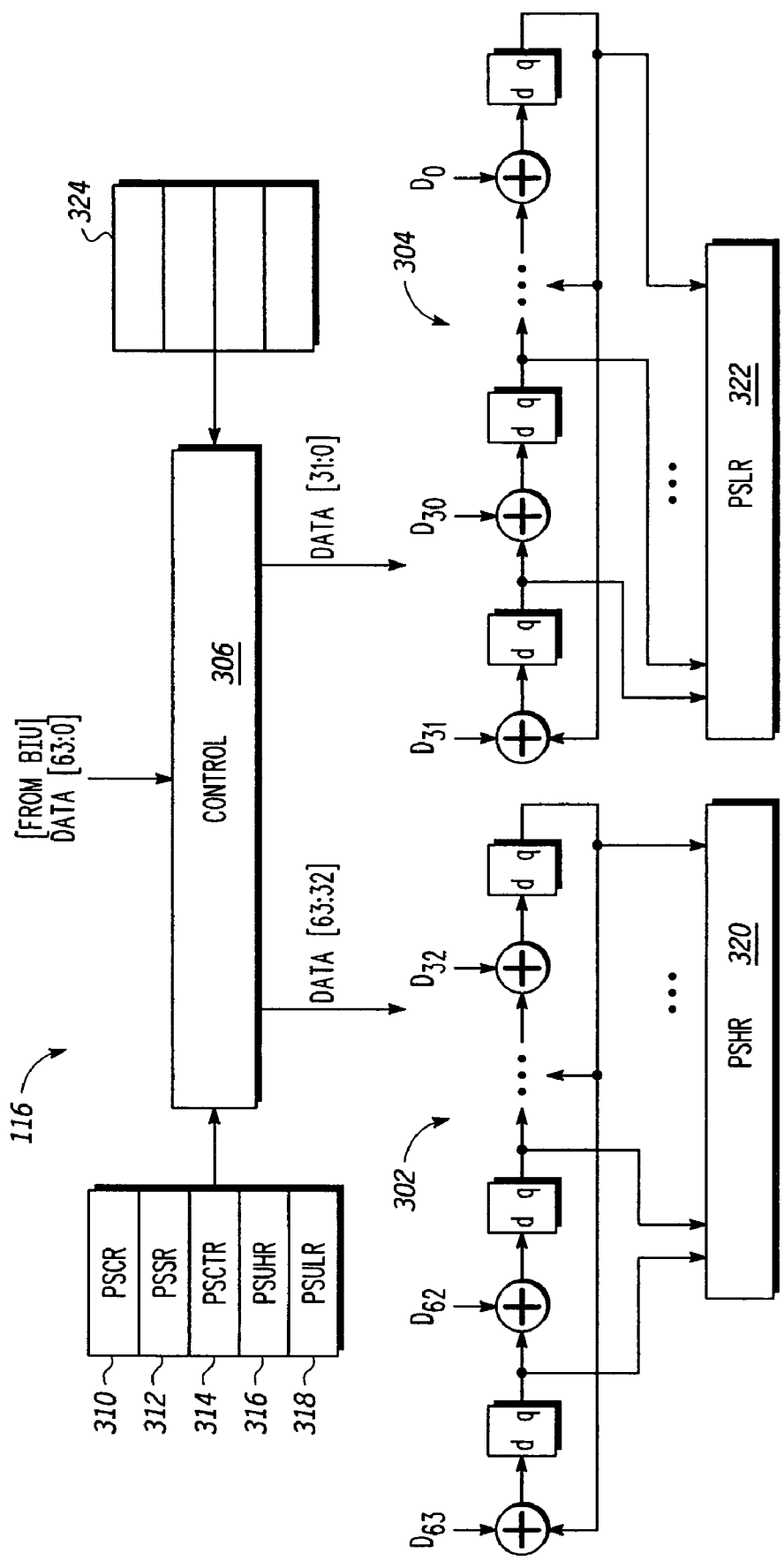
FIG. 3 is a block diagram illustrating an exemplary implementation of a parallel signature unit (PSU) of the processor of FIG. 2 in accordance with at least one embodiment of the present disclosure.

Referring now to FIG. 3, an exemplary implementation of the PSU 116 is illustrated in accordance with at least one embodiment of the present disclosure. In the illustrated embodiment the PSU 116 includes one or more accumulators, such as MISRs 302 and 304, a control module 306, special purpose registers 310-322, and an address range table 324. Certain components of the PSU 116, such as the control module 306, may be implemented as hardware (e.g., logic), software, firmware, or a combination thereof.

In the illustrated example, the PSU 116 includes two MISRs for each bus, one MISR 302 for the most significant bits of the bus and another MISR 304 for the least significant bits of the bus. For example, assuming that the bus 106 is 64 bits wide, one MISR may be utilized to accumulate the value provided over bit lines 0-31 and the other MISR may be utilized to accumulate the value transmitted over bit lines 32-63. However, a single MISR may be utilized for all of the bit lines of a bus without departing from the scope of the present disclosure. Moreover, a set of MISRs may be used to accumulate values transmitted over multiple buses, or each bus may have its own MISR or set of MISRs. For ease of illustration, an exemplary implementation having two MISRs for a single bus is illustrated.

In operation, the MISRs 302 and 304 are initialized or seeded with a value by, for example, writing the initialization or seed value to a parallel signature high register (PSHR) 320 (for the most significant bit portion) and to the parallel signature low register (PSLR) 322 (for the least significant bit portion). Each bit of the value written to the registers 320 and 322 is used by the control module 306 to set the corresponding stage of the MISRs 302 and 304 to the indicated bit value. Typically, when used for data integrity verification the initialization value is zero. However, when used for a pseudo random number generation operation, the seed value typically is non-zero so as to provide a pseudo random seed. After initialization, the PSU 116 begins to accumulate values provided by the BIU 114. The bits of the supplied data value may be supplied directly to the corresponding stages of the MISRs 302 and 304 or they may be supplied to the control module 306 which then directs the upper and lower bit portions to the appropriate MISR. Alternatively, the BIU 114 may write the value to the PSUHR 316 and PSULR 318, whereupon it is then supplied to the MISRs 302 and 304. The MISRs 302 and 304 accumulate the supplied values, wherein the MISR 302 accumulates the most significant bits of the data value from the BIU 114 and the MISR 304 accumulates the least significant bits of the data value supplied by the BIU 114. The value at each stage of the MISRs 302 and 304 may be written to the corresponding bit fields of registers 320 and 322, wherein register 320 is a parallel signature high register (PSHR) associated with the most significant bits of the accumulated value, and the register 322 is a parallel signature low register (PSLR) associated with the least significant bits of the accumulated value. One or both of the registers 320 and 322 may be accessed by another component of the processor 102 via for example a move instruction executed by software to directly access the register(s).

The control module 306 further may utilize registers 310, 312 and 314 to receive and provide control information with regard to the operation of the PSU 116. For example, control information may be written to the parallel signature control register (PSCR) 310 so as to control the operation of the PSU 116. The parallel signature status register (PSSR) 312 is utilized by the control module 306 to indicate a status of the operation of the PSU 116. Similarly the PSU 116 may utilize a parallel signature counter register (PSCTR) 314 to indicate the number of values accumulated in the present cycle. The registers 310-322 are illustrated in greater detail with reference to FIGS. 4-10.

In at least one embodiment, the PSU 116 is operable to accumulate values on the bus 106 having a select type or characteristic. For example, the PSU 116 may be limited to accumulating only data values associated with read accesses, or conversely the PSU 116 may be limited to accumulating data values associated with write accesses. As other examples, the PSU 116 may be operable to accumulate data associated only with write bursts or only with read bursts. Moreover, the PSU 116 may be operable to accumulate only those values associated with operations having addresses within a specified range. Accordingly, the PSU 116 may implement or maintain an address range table 324 having one or more fields representative of one or more address ranges. In the event that a bus operation involving an address listed in a selected address range of the table 324, the control module 306 permits the associated value to be accumulated in the MISRs 302 and 304. Conversely when a bus operation has an address that falls outside of an indicated address range in the table 324, the control module 306 prohibits or prevents the accumulation of the associated value. Thus, the PSU 116 may be configured so as to accumulate only those data values associated with select operations, where the criteria or permitted accumulation characteristic used to determine the select operations can be any desired criteria. Those skilled in the art may identify other suitable criteria or permitted accumulation characteristics using the guidelines provided herein. In addition, the determination of the select operations may be user programmable under hardware and/or software control.

Figure 4:
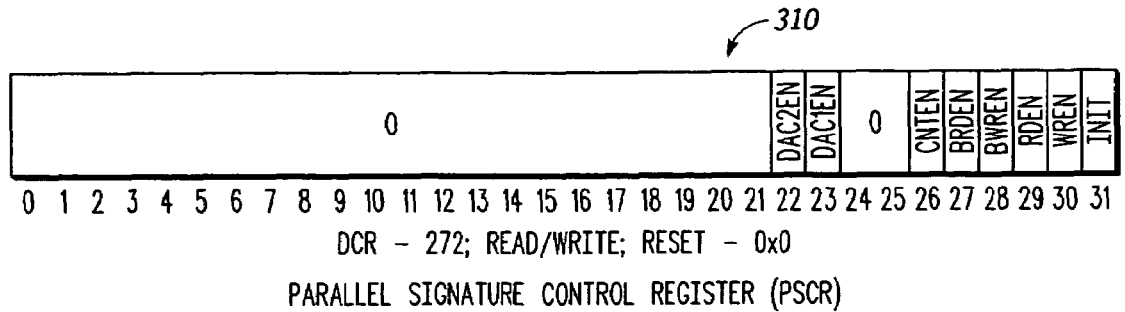

Referring now to FIGS. 4-10, exemplary implementation of the registers 310-322 is illustrated in accordance with at least one embodiment of the present disclosure. FIG. 4 illustrates an exemplary implementation of the PSCR 310. As illustrated in Table 1 below, the PSCR register 310 may include one or more bit fields (e.g., DAC1EN and DAC2EN) to indicate whether or not an address range comparison with one or more ranges stored in the address range table 324 is enabled. As also illustrated by Table 1, the PSCR 310 may include a bit field (CNTEN) to indicate whether or not the accumulation counter is enabled as well as a bit fields (BRDEN and BWREN) to indicate whether or not processor data burst read and write cycles are ignored or accumulated. The PSCR 310 further may include bit fields to enable the processor to accumulate or ignore single beat data read cycles (RDEN) or single beat write cycles (WREN).

TABLE 1

PSCR Field Descriptions

| Bits | Name | Description |
|---|---|---|
| 0:21 | — | These bits are reserved |
| 22 | DAC2EN | Data Address Range 2 Compare Enable<br>0 - Data Address Range 2 Compare is disabled.<br>1 - Data Address Range 2 compare is enabled. Data is only accumulated on address range compares. |
| 23 | DAC1EN | Data Address Range 1 Compare Enable<br>0 - Data Address Range 1 Compare is disabled.<br>1 - Data Address Range 1 compare is enabled. Data is only accumulated on address range compares. |
| 24:25 | — | These bits are reserved |
| 26 | CNTEN | Counter Enable<br>0 - Counter is disabled.<br>1 - Counter is enabled. Counter is incremented on every accumulated transfer. |
| 27 | BRDEN | Burst Read Enable<br>0 - Processor data burst read cycles are ignored.<br>1 - Processor data burst reads cycles are allowed to be accumulated. For inactive byte lanes, zeros are used for the data values. |
| 28 | BWREN | Burst Write Enable<br>0 - Processor burst write cycles are ignored.<br>1 - Processor burst write cycles are allowed to be accumulated. For inactive byte lanes, zeros are used for the data values. |
| 29 | RDEN | Single Beat Read Enable<br>0 - Processor data single beat read cycles are ignored.<br>1 - Processor data single beat reads cycles are allowed to be accumulated. For inactive byte lanes, zeros are used for the data values. |
| 30 | WREN | Single Beat Write Enable<br>0 - Processor data single beat write cycles are ignored.<br>1 - Processor data single beat write cycles are allowed to be accumulated. For inactive byte lanes, zeros are used for the data values. |
| 31 | INIT | This bit may be written with a '1' to set the values in the PSHR, PSLR, and PSCTR registers to all '0's (0x00000000). This bit reads as '0'. |

Figure 5:
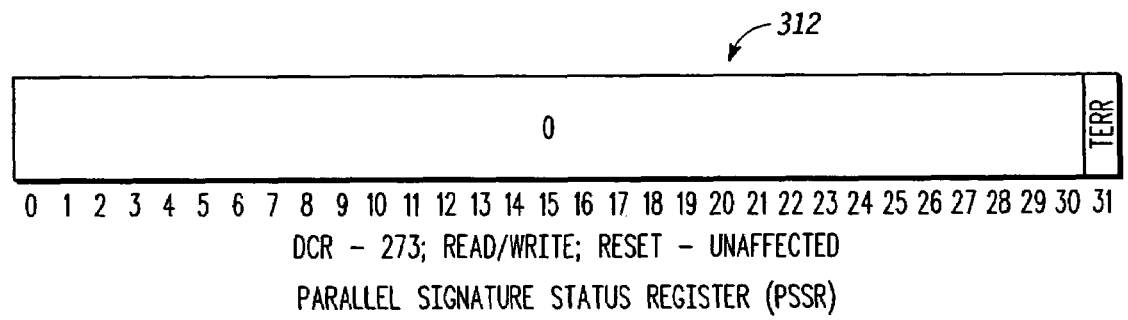

FIG. 5 illustrates an exemplary implementation of the PSSR 312. As illustrated in Table 2 below, the PSSR 312 may include one or more bit fields to indicate whether or not a transfer error has occurred. For example, if the actual accumulated data has been received without an error indication, the bit field (TERR) may be cleared with a zero to indicate that there is no transfer error. Conversely, if the actual accumulated data has been received with an error indication, the TERR field may be set by, for example, writing a one to this field.

TABLE 2

PSSR Field Descriptions

| Bits | Name | Description |
|---|---|---|
| 0:30 | — | These bits are reserved |
| 31 | TERR | 0 - No transfer error has occurred on accumulated read data since this bit was last cleared by software.<br>1 - A transfer error has occurred on accumulated read data since this bit was last cleared by software.<br>This bit indicates whether a transfer error has occurred |

TABLE 2-continued

PSSR Field Descriptions

| Bits | Name | Description |
|---|---|---|
| | | on accumulated read data, and that the read data values returned were ignored and zeros are used instead. A software write of '1' to this bit will cause it to be cleared. |

Figure 6:
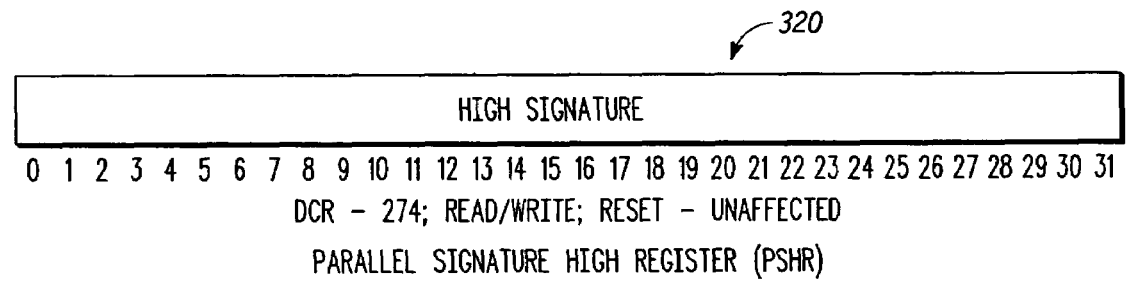
Figure 7:
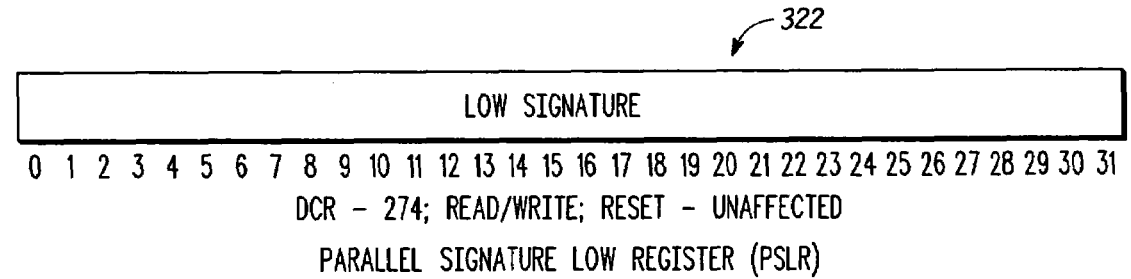

FIGS. 6 and 7 illustrate exemplary illustrations of the PSHR register 320 and the PSLR 322, respectively. In the illustrated examples these registers are 32 bits wide, with the PSHR 320 representing the most significant bits of the accumulated value (i.e. the stage values of the MISR 302), and the PSLR 322 storing the least significant bits of the accumulated value (i.e., the values of the stages of the MISR 304).

FIGS. 8 and 9 illustrate exemplary illustrations of the PSUHR 316 and the PSULR 318, respectively. As illustrated, the registers 316 and 318 may be, for example, 32 bits wide, with the PSUHR 316 representing the most significant bits fed to the MISR 302 and the PSULR 318 representing the least significant bits that are fed to the MISR 304. In addition to the accumulation of data values read or written to the bus 106 by BIU 114, software may directly cause accumulations to occur by executing instructions that move data directly to the PSUHR and PSULR, thereby avoiding the need to execute bus transfers via BIU 114 to cause data accumulation. Moving a value to PSUHR via a software move instruction causes an accumulation of the moved data to occur into the MISR 302, and moving a value to PSULR via a software move instruction causes an accumulation of the moved data to occur into the MISR 304. By providing such a mechanism, software may selectively exercise portions of system 100 to obtain data values to be accumulated, and use the results of the accumulations as an integrity verification of the portion of the system so exercised. For example, to check the integrity of execution units 202 of processor 102, software may execute a predetermined set of calculations utilizing one or more portions of execution units 202, and may verify proper operation by comparing the accumulated results of a sequence of calculations with an expected accumulated result. Such flexibility allows software to target specific portions of system 100 for integrity checking in a low cost and flexible manner.

FIG. 10 illustrates an exemplary implementation of the PSCTR 314. Note that, in alternate embodiments, the register fields indicated in FIGS. 4-10 may be any desired number of bits and may be located at any desired register.

Figure 11:
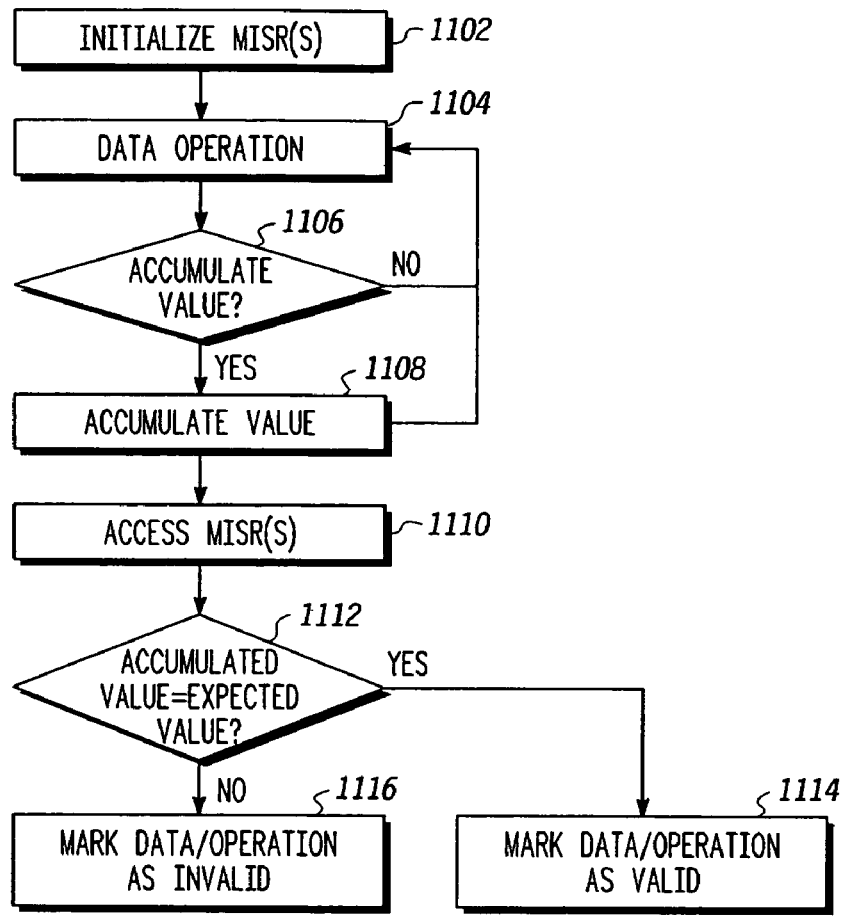
FIG. 11 is a flow diagram illustrating an exemplary data verification technique in accordance with at least one embodiment of the present disclosure.

Referring now to FIG. 11, an exemplary data integrity verification method 1100 is illustrated in accordance with at least one embodiment of the present disclosure. The method 1100 initiates at step 1102 wherein the MISRs 302 and 304 are initialized with an initial value (typically zero). MISRs 302 and 304 may be initialized, for example, by writing the most significant bits of the initialization value to the PSHR 320 and the least significant bits of the initialization value to PSLR 322.

At step 1104 a data transfer operation occurs on the bus 106 and the value on the bus associated with the operation is provided to the control module 306 of the PSU 116. At step 1106 the control module 306 determines whether or not the address associated with the bus operation is within a selected address range. If the address is within the selected range, or if the address range comparison feature is disabled, the value not discarded and is accumulated in the MISRs 302 and 304. Additionally, characteristics or types of the bus operation, such as write operation or a read operation may be used for a determination of whether or not the value associated with the type of bus operation is permitted to accumulate.

At step 1108 the value provided by the BIU 114 (if within the selected address range or of a particular data type) is accumulated in the MISRs 302 and 304 of the PSU 116. Steps 1104-1108 may be repeated one or more times until a breakpoint is reached in the data integrity verification routine 118 (FIG. 1), and a final accumulation has occurred. At step 1110, the data integrity verification routine 118 accesses the PSU 116 to obtain the final accumulated value. In one embodiment the accumulated value may be accessed by the software via the PSHR 320 and the PSLR 322, such as by a move operation to a general purpose register 208 (FIG. 1).

At step 1112 the actual accumulated value is compared to an expected value by the data integrity verification routine 118. The expected accumulation value for the particular breakpoint may be stored in cache associated with the processor 102 or as data stored in memory 104. In at least one embodiment, the expected accumulation value is predetermined based on a simulation of the system 100 using the same data transfer operations between the processor 102 and the memory 104. In the event that the actual accumulated value and the expected accumulation value are equal, the data and/or operations may be marked as valid at step 1114. Conversely, if the expected and actual accumulation values are not equal the data and/or operations occurring prior to this determination may be marked as invalid at step 1116. The indication that the data and/or operations are invalid may result in a termination of one or more routines executed by the processor 102, a complete shut down of the system 100, a notification to another system, and the like.

Figure 12:
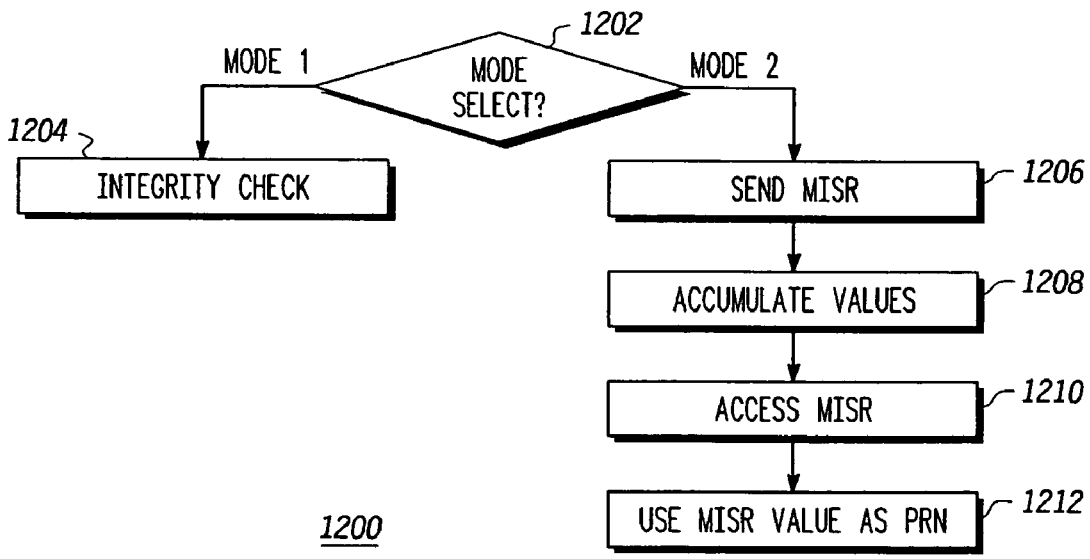
FIG. 12 is a flow diagram illustrating an exemplary dual-mode operation of the system illustrated in FIG. 1 in accordance with at least one embodiment of the present disclosure.

Referring now to FIG. 12 an exemplary dual-mode operation of the system 100 is illustrated in accordance with at least one embodiment of the present disclosure. As noted above the PSU 116 may operate in at least two modes. One mode includes accumulating data bus values for the purpose of verifying the integrity of the data stored in the memory 104 and/or the operation of the components utilized to effect data transfers between the memory 104 and the processor 102. Another mode comprises generating a pseudo random number for use by one or more programs executed by the processor 102. Accordingly, the method 1200 initiates at step 1202 when one of these two modes is selected. In the event that a data integrity verification mode is selected the method 1200 continues to step 1204 wherein a data integrity verification technique, such as the exemplary technique disclosed with respect to FIG. 11, may be implemented by the processor 102. Alternately, if a pseudo random number generation mode is selected, the method 1200 continues to step 1206, wherein one or both of the MISRs 302 and 304 are initialized with a seed value. As described above the MISRs 302 and 304 may be initiated with a value by writing the value to the PSHR 320 and the PSLR 322 (FIG. 3). At step 1208 one or more values are accumulated in the MISRs 302 and 304. In one embodiment, the processor 102 may initiate the transfer of data from random locations of the memory 104 so as to cause random values to be accumulated in the MISRs 302 and 304. Alternatively, software may cause accumulations directly by moving data values into update registers PSUHR 316 and PSULR 318 to cause generation of pseudo random values. At step 1210, a program utilizing a pseudo random number accesses the PSU 116 to obtain the accumulated value. As noted above, the accumulated value may be obtained from the PSU 116 by reading from the PSHR 320 and the PSLR 322 for the most significant bit portion and/or the least significant bit portion, respectively.

Other embodiments, uses, and advantages of the disclosure will be apparent to those skilled in the art from consideration of the specification and practice of the techniques disclosed herein. The specification and drawings should be considered exemplary only, and the scope of the disclosure is accordingly intended to be limited only by the following claims and equivalents thereof.

What is claimed is:

1. A method comprising:
receiving, at a processor, a plurality of values from a memory;
for each value of a subset of the plurality of values:
determining a characteristic associated with the value;
accumulating a most significant bit portion of the value in a first accumulator and accumulating a least significant bit portion of the value in a second accumulator responsive to determining the characteristic is compatible with a permitted accumulation characteristic;
avoiding accumulation of the most significant bit portion of the value in the first accumulator and avoiding accumulation of the least significant bit portion of the value in the second accumulator responsive to determining the characteristic is incompatible with the permitted accumulation characteristic; and
accessing at least one of the first and the second accumulator to obtain an accumulated value; and
comparing the accumulated value with an expected accumulated value.

2. The method of claim 1, wherein the at least one of the first accumulator and the second accumulator includes a multiple-input signature register (MISR).

3. The method of claim 1, wherein the characteristic is an address value and the permitted accumulation characteristic is an address range.

4. The method of claim 1, wherein the characteristic is a data transfer type and the permitted accumulation characteristic is one or more permitted data transfer types.

5. The method of claim 1, wherein accessing at least one of the first accumulator and the second accumulator comprises:
reading the accumulated value from one or more registers associated with the at least one of the first accumulator and the second accumulator.

6. The method of claim 1, further comprising:
initializing at least one of the first accumulator and the second accumulator.

7. The method of claim 6, wherein initializing at least one of the first accumulator and the second accumulator comprises:
writing an initialization value to one or more registers associated with at least one of the first accumulator or the second accumulator.

8. The method of claim 1, further comprising:
identifying at least the subset of the plurality of values as invalid when the accumulated value is not equal to the expected accumulated value.

9. A method comprising:
performing a plurality of load operations at a processor to access data values stored in a sequence of fields of a memory;
accumulating a most significant bit portion of each data value in a first accumulator and accumulating a least significant bit portion of each data value in second accumulator for each data value having a characteristic compatible with a permitted accumulation characteristic to generate an accumulated value; and
determining whether the memory has been corrupted based on a comparison of the accumulated value to an expected accumulation value.

10. The method of claim 9, wherein the data values are representative of at least one of: instruction data, operation data or constants.

11. The method of claim 9, wherein comparing the accumulated value to the expected accumulated value comprises obtaining the accumulated value from one or more registers of the processor associated with the at least one of the first accumulator and the second accumulator.

12. A processor comprising:
a bus interface unit operable to couple to one or more busses connected to a memory;
a first accumulator;
a second accumulator;
an execution unit operable to perform one or more data transfer operations between the processor and the memory via the one or more busses; and
a control module operable to:
for each value of at least a subset of one or more values received from the bus interface unit;
determine a characteristic associated with the value; and
provide a most significant bit portion of the value to the first accumulator and a least significant bit portion of the value to the second accumulator for accumulation responsive to the characteristic being compatible with a permitted accumulation characteristic.

13. The processor of claim 12, wherein the first accumulator includes a first multiple input signature register (MISR) and the second accumulator includes a second MISR.

14. The processor of claim 12, further comprising:
a first set of one or more registers operable to receive a first initialization value for initializing the at least the first accumulator;
a second set of one or more registers operable to receive an accumulated value from at least the first accumulator;
a third set of one or more registers operable to receive a second initialization value for initializing the at least the second accumulator; and
a fourth set of one or more registers operable to receive an accumulated value from at least the second accumulator.

15. The processor of claim 14, wherein the execution unit is operable to obtain an accumulated value via the second set of one or more registers and the fourth set of one or more registers.

16. The processor of claim 14, wherein the execution unit is further operable to initialize the first accumulator by writing the first initialization value to the first set of one or more registers and initialize the second accumulator by writing the second initialization value to the third set of one or more registers.

17. The processor of claim 12, wherein the characteristic is an address value and the permitted accumulation characteristic is an address range.

18. The processor of claim 12, wherein the characteristic is a data transfer type and the permitted accumulation characteristic is one or more permitted data transfer types.

19. A method comprising:
when in a first mode:
initializing an accumulator of a processor with a seed value;
accumulating a first set of one or more values at the accumulator; and utilizing a first resulting accumulated value as a pseudo-random number by one or more programs of the processor; and when in a second mode:

accumulating a second set of one or more values at the accumulator, the one or more values of the second set obtained from a predetermined sequence of data transfers between the processor and a memory; and determining an integrity of the memory based on a comparison of a second resulting accumulated value with an expected accumulated value.

20. The method of claim 19, wherein the one or more values of the first set are obtained from data transfers between the processor and a memory.

21. The method of claim 19, wherein the one or more values of the first set are obtained from executing register movement instructions to transfer data values from a processor general purpose register to the accumulator within the processor.

22. The method of claim 19, wherein accumulating the second set of one or more values at the accumulator comprises:

determining a characteristic associated with a select value of the second set of one or more values;

accumulating the select value when the characteristic is compatible with a permitted accumulation characteristic; and avoiding accumulation of the select value when the characteristic is incompatible with the permitted accumulation characteristic.

23. The method of claim 22, wherein the characteristic is an address value and the permitted accumulation characteristic is an address range.

24. The method of claim 22, wherein the characteristic is a data transfer type and the permitted accumulation characteristic is one or more permitted data transfer types.

25. The method of claim 19, further comprising:
initializing the accumulator.

26. The method of claim 25, wherein initializing the accumulator comprises:

writing an initialization value to one or more registers associated with the accumulator.

27. The method of claim 19, further comprising:
identifying at least the subset of the second set of one or more values as invalid when the second resulting accumulated value is not equal to the expected accumulated value.

28. A processor comprising:

a bus interface unit operable to couple to one or more busses connected to a memory;

an execution unit operable to perform one or more data transfer operations between the processor and the memory via the one or more busses.

an accumulator operable to:

in a first mode:

accumulate a first set of one or more values obtained from one or more data transfer operations between the processor and the memory; and provide a first resulting accumulated value as a pseudo-random number for use by one or more programs executed at the processor; and in a second mode:

accumulate a second set of one or more values obtained from a predetermined sequence of data transfers operations between the processor and the memory; and determine an integrity of the memory based on a comparison of a second resulting accumulated value with an expected accumulated value.

29. The processor of claim 28, wherein the accumulator includes a first multiple input signature register (MISR).

30. The processor of claim 28, further comprising:

a first set of one or more registers operable to receive an initialization value for initializing the accumulator; and a second set of one or more registers operable to receive an accumulated value from the accumulator.

31. The processor of claim 30, wherein the execution unit is operable to obtain an accumulated value via the second set of one or more registers.

32. The processor of claim 30, wherein the execution unit is further operable to initialize the accumulator by writing the initialization value to the first set of one or more registers.

* * * * *